(12) United States Patent
Shaw et al.

(10) Patent No.: US 7,895,181 B2
(45) Date of Patent: Feb. 22, 2011

(54) CONFIGURATION-BASED SEARCH

(75) Inventors: James Shaw, Chula Vista, CA (US);
Cindy X. Deng, San Diego, CA (US);
Douglas L. Foiles, San Diego, CA (US);
Kam M. Law, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 372 days.

(21) Appl. No.: 12/024,817

(22) Filed: Feb. 1, 2008

(65) Prior Publication Data
US 2009/0198669 A1 Aug. 6, 2009

(51) Int. Cl.
*G06F 17/30* (2006.01)
(52) U.S. Cl. .................................................. 707/706
(58) Field of Classification Search .............. 707/2, 707/3, 10, 104.1, 706; 704/10
See application file for complete search history.

(56) References Cited

U.S. PATENT DOCUMENTS 6,625,595 B1 * 9/2003 Anderson et al. .............. 1/1
2003/0050773 A1 * 3/2003 Martinez et al. ............. 704/10
2003/0088559 A1 * 5/2003 Teranishi ....................... 707/3
2004/0181515 A1 * 9/2004 Ullmann et al. ............... 707/3

* cited by examiner

*Primary Examiner*—Etienne P LeRoux
(74) *Attorney, Agent, or Firm*—Park, Vaughan, Fleming & Dawler LLP

(57) ABSTRACT

A system that tunes search results is presented. During operation, the system receives content to be searched. The system then iteratively performs the following operations until search results meet specified criteria. The system generates an index of the content based on a set of configuration parameters. Next, the system performs a search against the index to produce the search results. The system then determines whether the search results meet the specified criteria. If the search results do not meet the specified criteria, the system modifies one or more of: the set of configuration parameters; and the content. If the search results meet the specified criteria, the system saves the set of configuration parameters into a configuration file which can be used to generate the index for the content.

26 Claims, 21 Drawing Sheets

| FILE | HELP | | |
|---|---|---|---|
| CREATE INDEX | TEST SEARCH | OPTIONS | |

| SINGLE QUERY | BATCH QUERY |
|---|---|

CLICK SELECT FILTERS TO SPECIFY SKU FILTERS, PREFERENCES, AND SERVICES: [SELECT FILTERS...]

SKU FILTER: NONE
PREFERENCES: PREF_EMAIL_MAPI;PREF_EMAIL_QB;PREF_COACH
SERVICES: SVC_QBMS;SVC_PAYROLL;SVC_QBBS

ENTER A SINGLE-LINE QUERY OR SELECT AN EXISTING ONE IN THE DROP-DOWN LIST AND THEN CLICK SEARCH

CREATE INVOICE  ▼    [SEARCH]

SEARCH RESULTS: 2 TOPICS FOUND IN THIS SEARCH.

| # | TITLE | SCORE(%) | PATH |
|---|---|---|---|
| 1 | WHAT'S IMPORTANT ABOUT THE CREATE ALERT WINDOW | 0.04 | C:\CONTENT\TOPIC1 |
| 2 | SET UP A REMINDER FOR SOMETHING YOU NEED TO DO | 0.06 | C:\CONTENT\TOPIC2 |

[VIEW TOPIC W/HIGHLIGHTED WORDS] [EDIT TOPIC]

[VIEW OTHER TOPIC W/HIGHLIGHTED WORDS...]

INTERNAL QUERY SYNTAX:
[|[TITLE:CREAT TITLE:INVOIC TITLE:ADD^0.8

FIG. 10A

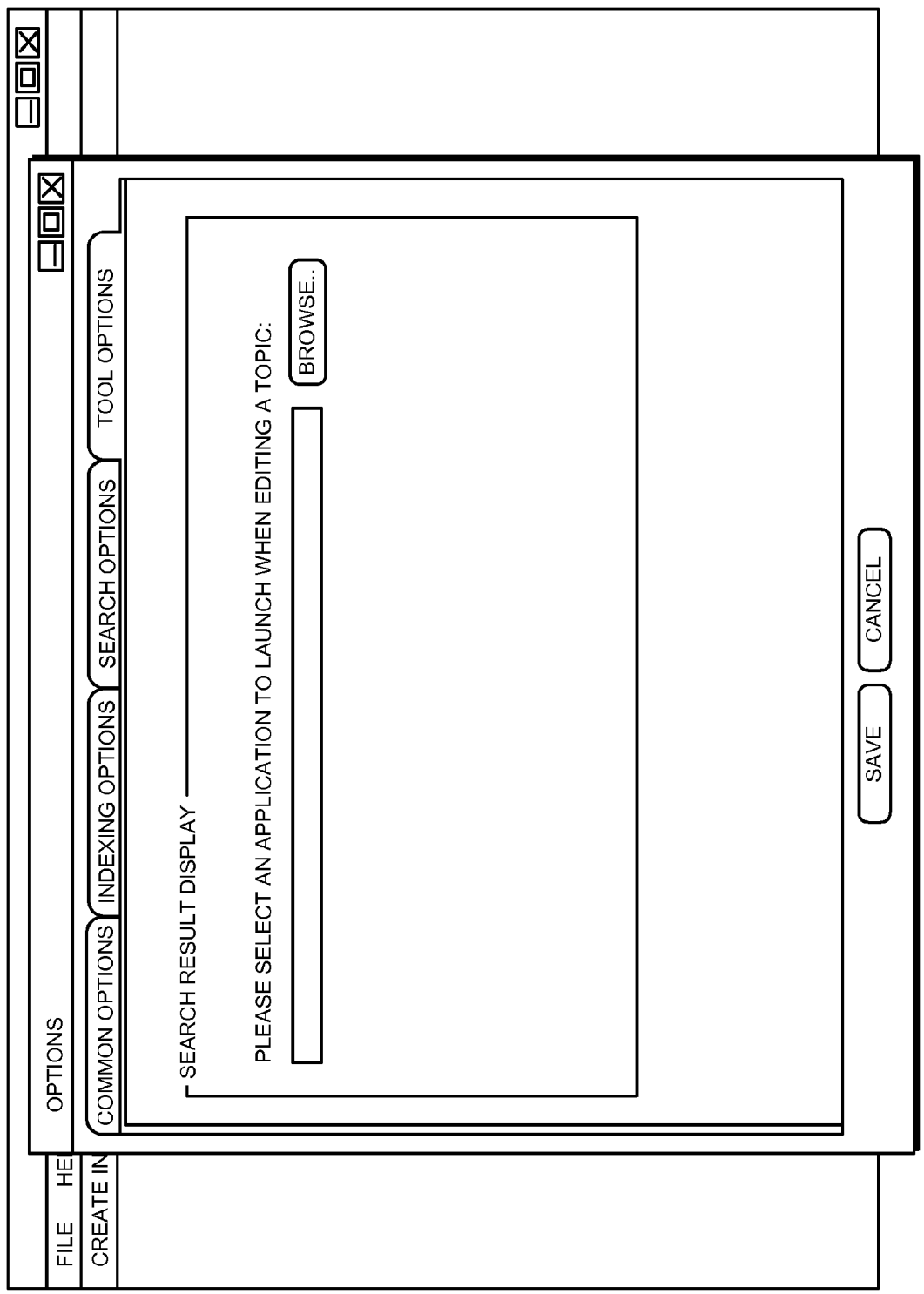

CONFIGURATION-BASED SEARCH

BACKGROUND

Related Art

The present invention relates to techniques for performing searches.

Content authors are typically the best people to evaluate the relevancy of search results from user queries. Unfortunately, content authors typically do not have the technical knowledge to make changes to the search engine to tune search results, and instead rely on engineers to do make changes to the search engine. Thus, the existing process of tuning search results is time-consuming and inefficient.

SUMMARY

Some embodiments of the present invention provide a system that tunes search results. During operation, the system receives content to be searched. The system then iteratively performs the following operations until search results meet specified criteria. First, the system generates an index of the content based on a set of configuration parameters. Next, the system performs a search against the index to produce the search results. A content author then determines whether the search results meet the specified criteria. If the search results do not meet the specified criteria, the content author modifies one or more of: the set of configuration parameters; and the content. If the search results meet the specified criteria, the system then saves the set of configuration parameters into a configuration file which can be used to generate the index for the content to configure a search engine during run-time for the searches.

In some embodiments, prior to receiving the content to be searched, the content author generates the content to be searched.

In some embodiments, after receiving the content to be searched, the system determines the set of configuration parameters which are used to generate the index for the content.

In some embodiments, after saving the set of configuration parameters into the configuration file, the system distributes the configuration file to one or more applications, wherein the one or more applications can use the set of configuration parameters to build the index against which the search can be performed.

In some embodiments, the set of configuration parameters include one or more of: indexing parameters; search parameters; an indication as to whether to use stemming; supported languages; a list of stemming override words; and a list of ignore words.

In some embodiments, the indexing parameters include one or more of: a path to a location of the content; a path to the index; index fields; index field parameters; and an omit field which specifies that the content is to be omitted from search results.

In some embodiments, the index fields include one or more of: hypertext-markup language (HTML) tags; and meta-tags.

In some embodiments, the index field parameters include one or more of: a weighting factor associated with the index field; an indication as to whether the field is stored in the index; an indication as to whether the field is indexed; an indication as to whether the field is tokenized; an indication as to whether the field is untokenized; an indication as to whether the field is an standard HTML tag or a meta-tag; and an indication as to whether the field is added to a dictionary which can be used to make spelling suggestions to a user.

In some embodiments, the search parameters include one or more of: a list of synonyms; a weighting factor associated with synonyms; a list of words added to the dictionary; and query templates which include one or more of: fields to be searched; Boolean operators to be used in the search; and a weighting factor based on proximity of words to each other.

In some embodiments, the content includes one or more of: HTML files; text files; portable-document format (PDF) documents; spreadsheets; word processor documents; and presentations.

In some embodiments, the specified criteria include metrics which indicate whether search terms used to perform the search produce search results that include the content.

Some embodiments of the present invention provide an apparatus that tunes search results. The apparatus includes one or more of a receiving module, an indexing module, a search engine, an analysis module, a modification module, and an output module. The receiving module is configured to receive content to be searched. The indexing module is configured to generate an index of the content based on a set of configuration parameters. The search engine is configured to perform a search against the index to produce the search results. The analysis module is configured to determine whether the search results meet the specified criteria. If the analysis module determines that the search results do not meet the specified criteria, the modification module is configured to modify one or more of: the set of configuration parameters; and the content. If the analysis module determines that the search results meet the specified criteria, the output module is configured to save the set of configuration parameters into a configuration file which can be used to generate the index for the content and to perform searches during run-time.

Some embodiments of the present invention provide a system that performs a configuration-based search of content. During operation, the system receives the content to be searched from a content provider. The system then receives a set of configuration parameters from the content provider. Next, the system generates an index of the content based on a set of configuration parameters. The system then receives one or more search terms from the content provider. Next, the system performs a search against the index based on the one or more search terms to produce the search results. The system then reports the search results to the content provider.

Some embodiments of the present invention provide a system that performs a configuration-based search of content. During operation, the system receives one or more search terms from a user. Next, the system retrieves configuration parameters and an index associated with the content. The system then configures a search engine using the configuration parameters. Next, the system uses the search engine to perform a search against the index based on the one or more search terms to produce the search results. The system then reports the search results to the user.

BRIEF DESCRIPTION OF THE FIGURES

FIG. 10A presents an exemplary user interface window for performing single queries in accordance with an embodiment of the present invention.

FIG. 11I presents an exemplary user interface window for specifying an application to be launched when editing a topic in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code, data structures, and/or data, which can be stored on a computer-readable storage medium as described above. When a computer system reads and executes the code and/or data stored on the computer-readable storage medium, the computer system performs the methods and processes embodied as code, data structures, and/or data that are stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computer System

Figure 1A:
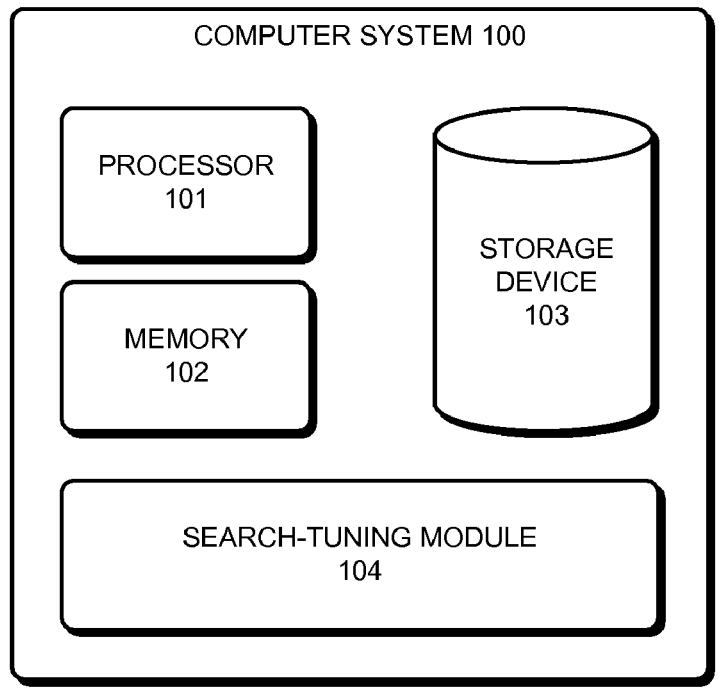
FIG. 1A presents a block diagram illustrating a computer system in accordance with an embodiment of the present invention.

FIG. 1 presents a block diagram illustrating a computer system 100 in accordance with an embodiment of the present invention. Computer system 100 includes processor 101, memory 102, storage device 103, and search-tuning module 104.

Processor 101 can generally include any type of processor, including, but not limited to, a microprocessor, a mainframe computer, a digital signal processor, a personal organizer, a device controller and a computational engine within an appliance. Memory 102 can include any type of memory, including but not limited to, dynamic random access memory (DRAM), static random access memory (SRAM), flash memory, read only memory (ROM), and any other type of memory now known or later developed. Storage device 103 can include any type of non-volatile storage device that can be coupled to a computer system. This includes, but is not limited to, magnetic, optical, and magneto-optical storage devices, as well as storage devices based on flash memory and/or battery-backed up memory.

In some embodiments of the present invention, search-tuning module 104 is separate from computer system 100. Note that search-tuning module 104 is described in more detail below with reference to FIG. 1B.

Figure 1B:
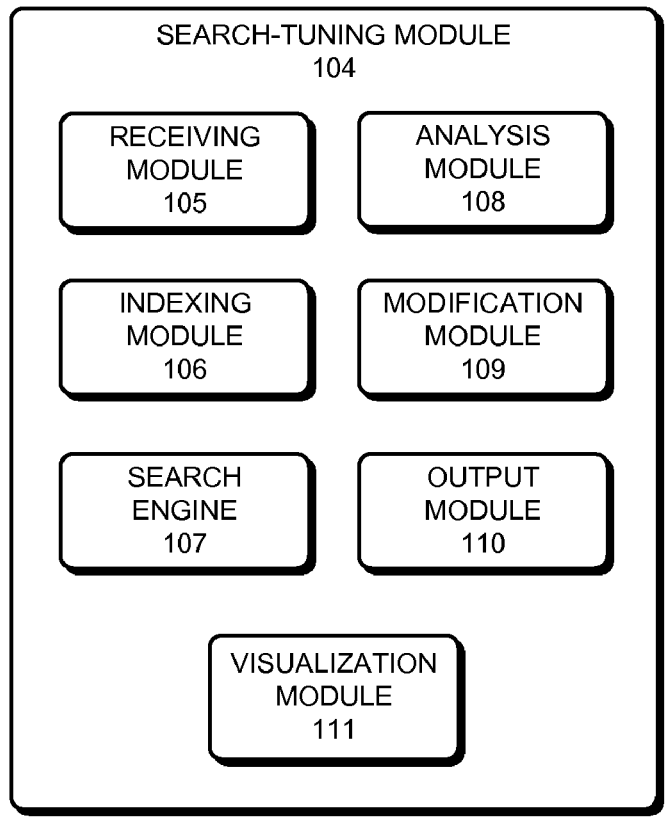
FIG. 1B presents a block diagram of a search-tuning module in accordance with an embodiment of the present invention.

FIG. 1B presents a block diagram of search-tuning module 104 in accordance with an embodiment of the present invention. Search-tuning module 104 includes one or more of receiving module 105, indexing module 106, search engine 107, analysis module 108, modification module 109, output module 110, and visualization module 111. Receiving module 105 is configured to receive content to be searched. Indexing module 106 is configured to generate an index of the content based on a set of configuration parameters. Search engine 107 is configured to perform a search against the index to produce the search results. Analysis module 108 is configured to determine whether the search results meet the specified criteria. If analysis module 108 determines that the search results do not meet the specified criteria, modification module 109 is configured to modify one or more of: the set of configuration parameters; and the content. If analysis module 108 determines that the search results meet the specified criteria, output module 110 is configured to save the set of configuration parameters into a configuration file which can be used to generate the index for the content. Visualization module 111 is configured to display one or more search results in a user interface of a computer system.

In some embodiments, if a given search result is selected within the user interface of the computer system, visualization module 111 is configured to: display the content included in the given search result in the user interface; and highlight one or more of: words in the content that have been indexed; and words in the content that matched search terms used to perform the search, while accounting for ignored words (not highlighted), words based on the same stem (highlighted), and synonyms (highlighted).

In some embodiments, if a user uses a pointing device, such as a mouse, to hover over a given word in the displayed content within the user interface, visualization module 111 is configured to display synonyms associated with the word in the user interface.

Tuning Search Results

Figure 2:
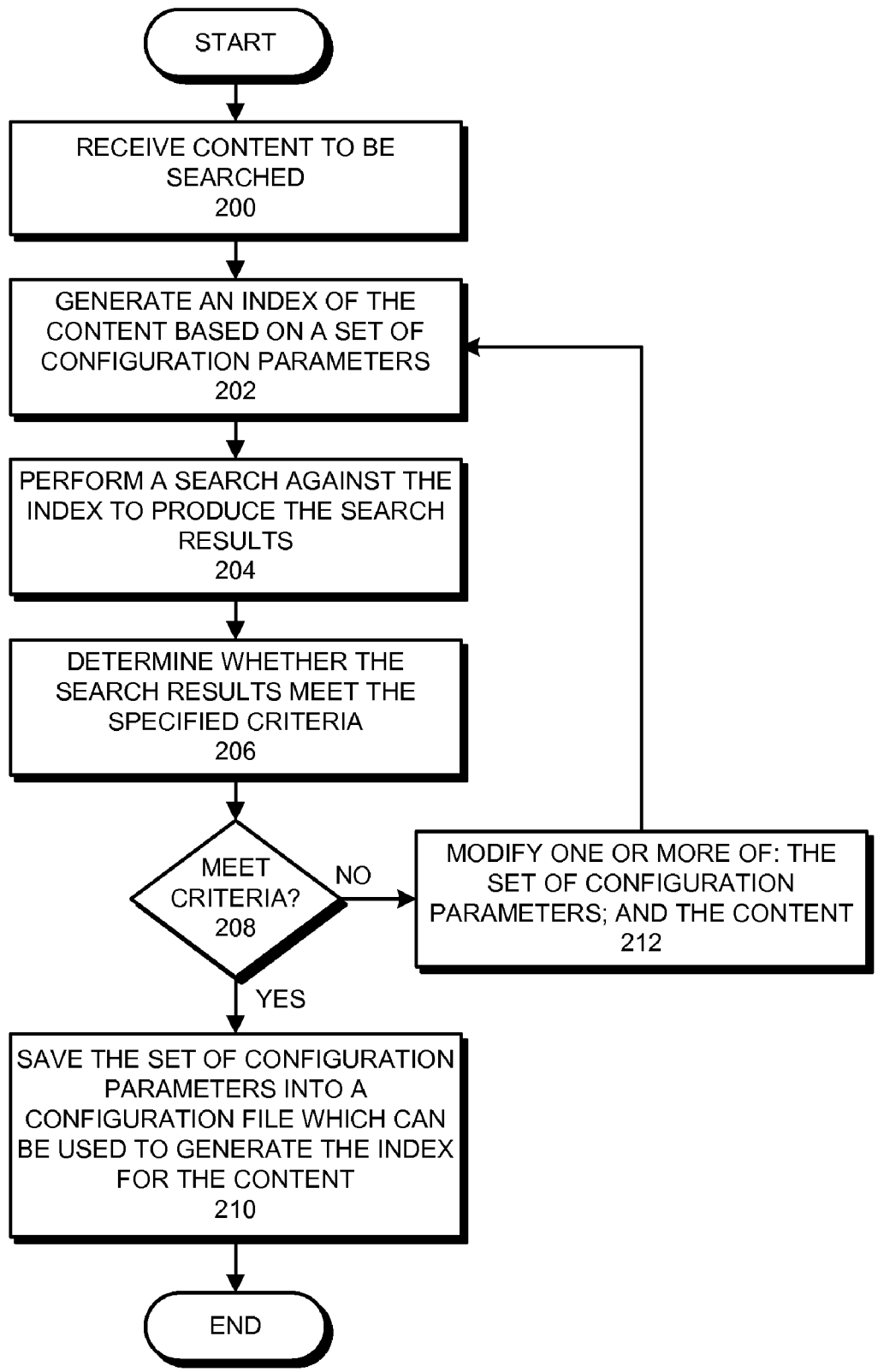
FIG. 2 presents a flow chart illustrating a process for tuning search results in accordance with an embodiment of the present invention.

FIG. 2 presents a flow chart illustrating a process for tuning search results in accordance with an embodiment of the present invention. The process begins when the system receives content to be searched (step 200). The system first generates an index of the content based on a set of configuration parameters (step 202). Next, the system performs a search against the index to produce the search results (step 204). The content author then determines whether the search results meet the specified criteria (step 206). If the search results do not meet the specified criteria (step 208, no), the content author modifies one or more of: the set of configuration parameters; and the content. The content author then returns to step 202. If the search results meet the specified criteria (step 208, yes), the system saves the set of configuration parameters into a configuration file which can be used to generate the index for the content.

In some embodiments, prior to receiving the content to be searched, the content author generates the content to be searched. For example, the content author can include: a content analyst, an author, or content provider.

In some embodiments, after receiving the content to be searched, the system determines the set of configuration parameters which are used to generate the index of the content.

In some embodiments, after saving the set of configuration parameters into the configuration file, the system distributes the configuration file to one or more applications, wherein the one or more applications can use the set of configuration parameters to build the index against which the search can be performed.

In some embodiments, the set of configuration parameters include one or more of: indexing parameters; search parameters; an indication as to whether to use stemming; supported languages; a list of stemming override words; and a list of ignore words.

In some embodiments, the indexing parameters include one or more of: a path to a location of the content; a path to the index; index fields; index field parameters; and an omit field which specifies that the content is to be omitted from search results.

In some embodiments, the index fields include one or more of: hypertext-markup language (HTML) tags; and meta-tags.

In some embodiments, the index field parameters include one or more of: a weighting factor associated with the index field; an indication as to whether the field is stored in the index; an indication as to whether the field is indexed; an indication as to whether the field is tokenized; an indication as to whether the field is untokenized; an indication as to whether the field is an HTML tag; an indication as to whether the field is a meta-tag; and an indication as to whether the field is added to a dictionary which can be used to make spelling suggestions to a user.

In some embodiments, the search parameters include one or more of: a list of synonyms; a weighting factor associated with synonyms; a list of known words; and query templates which include one or more of: fields to be searched; Boolean operators to be used in the search; and a weighting factor based on proximity of words to each other.

In some embodiments, the content includes one or more of: HTML files; text files; portable-document format (PDF) documents; spreadsheets; word processor documents; and presentations.

In some embodiments, the specified criteria include metrics which indicate whether search terms used to perform the search produce search results that include the content.

Figure 3:
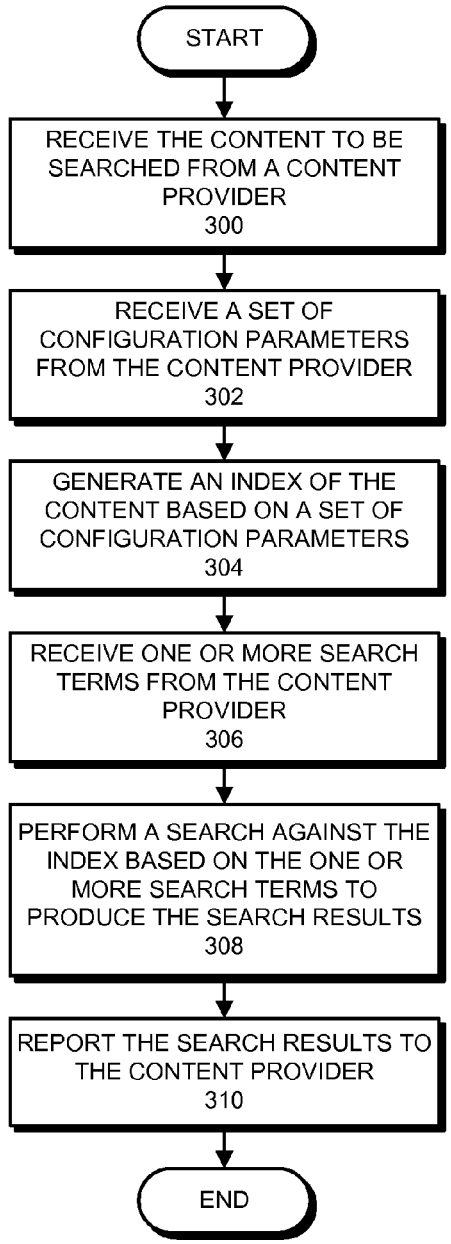
FIG. 3 presents a flow chart illustrating a process for performing a configuration-based search of content in accordance with an embodiment of the present invention.

In some embodiments, a content provider tunes search results using a configuration-based search-tuning tool. FIG. 3 presents a flow chart illustrating a process for performing a configuration-based search of content for a content provider in accordance with an embodiment of the present invention. The process begins when the system receives the content to be searched from a content provider (step 300). The system then receives a set of configuration parameters from the content provider (step 302). Next, the system generates an index of the content based on a set of configuration parameters (step 304). The system then receives one or more search terms from the content provider (step 306). Next, the system performs a search against the index based on the one or more search terms to produce the search results (step 308). The system then reports the search results to the content provider (step 310).

Figure 4:
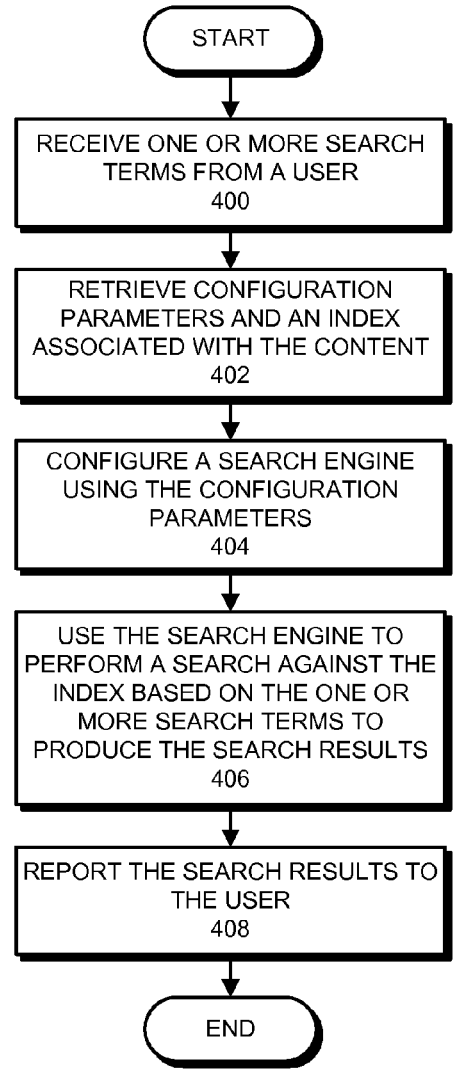
FIG. 4 presents a flow chart illustrating another process for performing a configuration-based search of content in accordance with an embodiment of the present invention.

FIG. 4 presents a flow chart illustrating a process for performing a configuration-based search of content for a user in accordance with an embodiment of the present invention. The process begins when the system receives one or more search terms from a user (step 400). Next, the system retrieves configuration parameters and an index associated with the content (step 402). The system then configures a search engine using the configuration parameters (step 404). Next, the system uses the search engine to perform a search against the index based on the one or more search terms to produce the search results (step 406). The system then reports the search results to the user (step 408).

Exemplary Implementation

Figure 5:
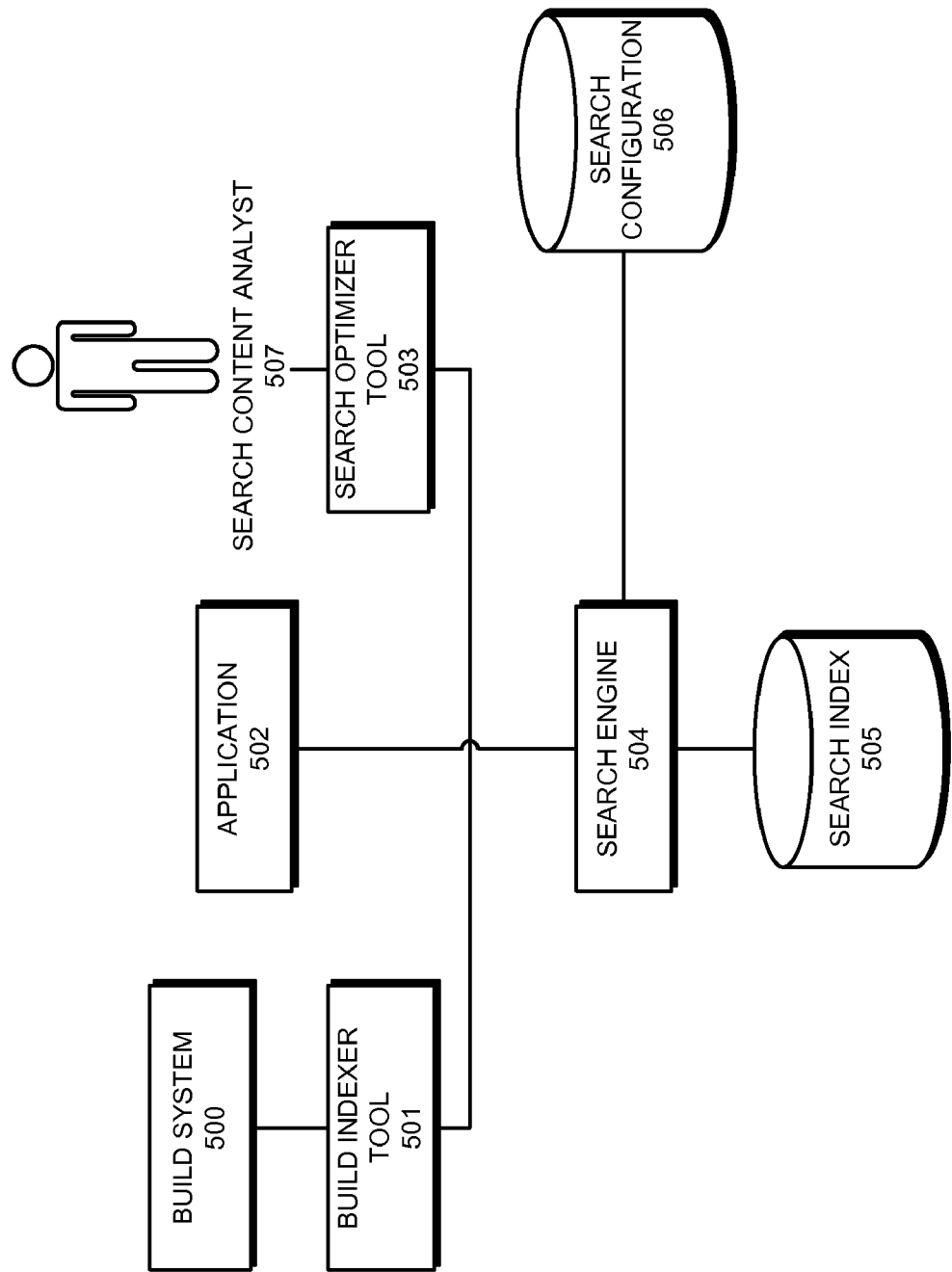
FIG. 5 presents a block diagram illustrating an exemplary system which performs configuration-based search in accordance with an embodiment of the present invention.

FIG. 5 presents a block diagram illustrating an exemplary system which performs a configuration-based search in accordance with an embodiment of the present invention.

In some embodiments build system 500 provides the ability to build the application 502. Build system 500 uses build indexer tool 501 to perform indexing operations based on search configuration 506 for the content that is to be searched by application 502. These indexing operations produce a set of index files which are used during search operations. These index files are included with the other application runtime artifacts during installation of application 502 on an end user's computer system.

In some embodiments, application 502 is a product that needs to provide the search capability. For example, application 502 can include a help system which can be used to search for documentation related to the use of application 502. Application 502 uses search engine 504 to provide the search capabilities. In some embodiments, search engine 504 is included with application 502. In other embodiments, search engine 504 is separate from application 502.

In some embodiments, search content analyst 507 is a content author that produces the content to be searched. In some embodiments, search content analyst 507 also performs analysis and/or tuning of the content and/or the search engine 504.

In some embodiments, build indexer tool 501 creates the index files from the content that is to be searched. These index files are used to perform the search operations.

In some embodiments, search optimizer tool 503 allows search content analyst 507 to analyze search results and to tune both content and parameters for search engine 504. In some embodiments, search optimizer tool 503 is a graphical user interface (GUI) application that is run by search content analyst 507 on a computer system for search content analyst 507.

In some embodiments, search optimizer tool 503 creates indexes against a number of content formats, performs search queries (including the ability to perform detailed analysis on the results), and allows search content analyst 507 to specify configurations to be used to control both indexing and search operations.

In some embodiments, search engine 504 provides search functionality. In some embodiments, the search functionality is configured using configuration parameters included in search configuration 506. In some embodiments, search engine 504 is used with the specific configuration parameters which are shared across build indexer tool 501, search optimizer tool 503, and application 502.

In some embodiments, search engine 504 uses a low-level library which provides basic search functionality.

In some embodiments, search configuration 506 includes search configuration meta-data used to control indexing and searching operations for search engine 504. In some embodiments, each user of search engine 504 can specify their own specific configuration parameters, enabling the search engine 504 to serve the specific needs of different users.

In some embodiments, search index 505 includes a set of files that includes the search indexes used for performing search operations. These index files are generated during an indexing operation and are used during a search operation. In some embodiments, a specific set of index files is included for each set of content that is to be searched within application 502. In some embodiments, searches can be performed across a distributed set of index files.

Figure 6:
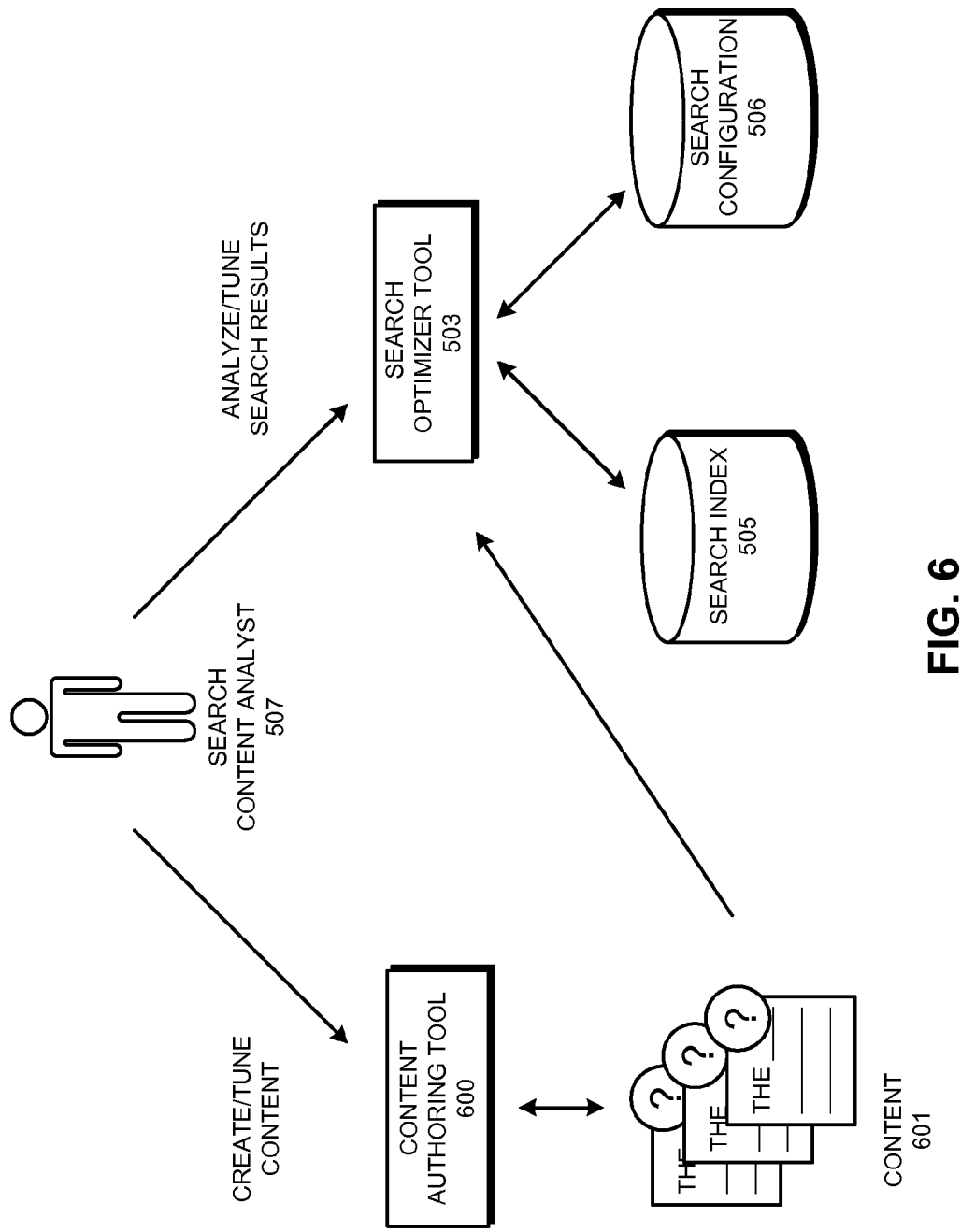
FIG. 6 presents a block diagram illustrating an exemplary process for performing configuration-based search in accordance with an embodiment of the present invention.

FIG. 6 presents a block diagram illustrating an exemplary process for performing configuration-based search in accordance with an embodiment of the present invention. FIG. 6 illustrates the steps where search content analyst 507 (e.g., a content author) uses content authoring tool 600 to generate content 601 which is to be searched. Search content analyst 507 then analyzes the search results to help tune the content and search engine. This process is an iterative process wherein search content analyst 507 analyses search results, and tunes the content and/or configuration parameters. In some embodiments, search content analyst 507 specifies search configuration 506 which is used across multiple applications.

Figure 7:
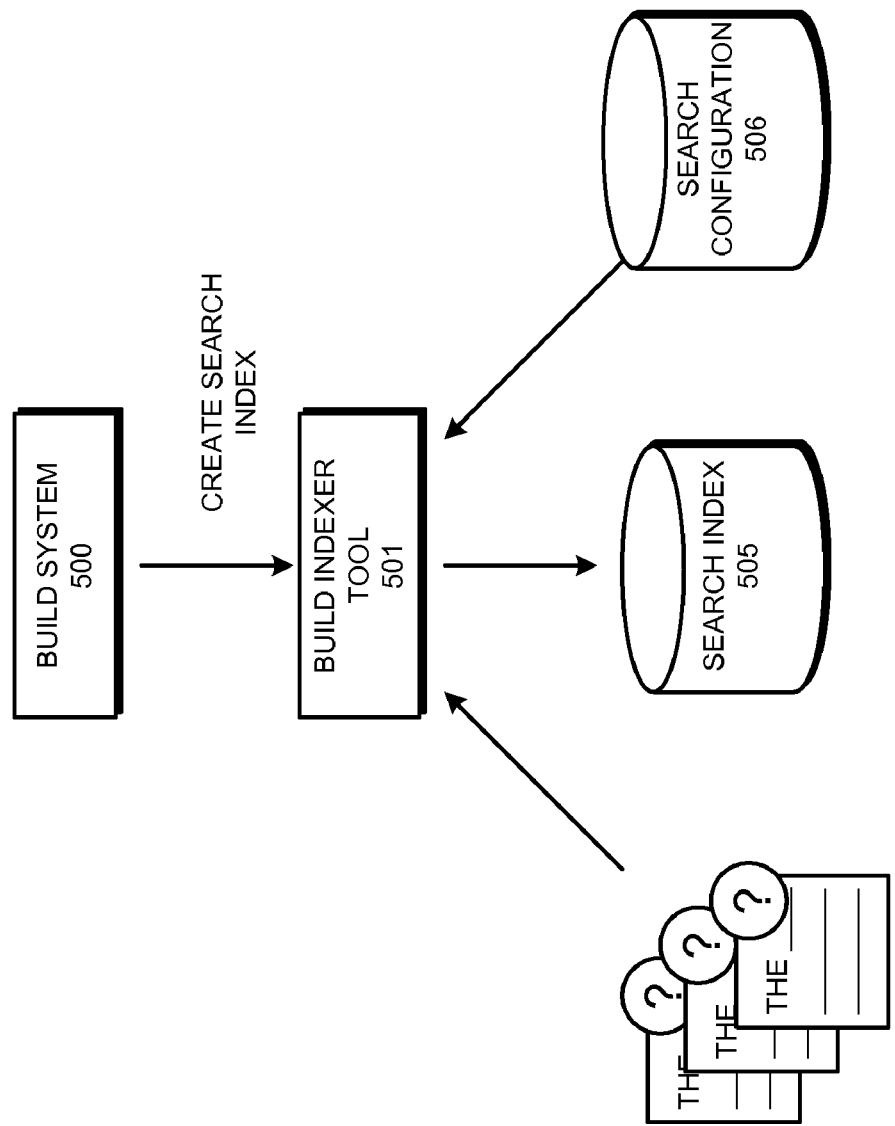
FIG. 7 presents a block diagram which continues the process illustrated in FIG. 6 in accordance with an embodiment of the present invention.

FIG. 7 presents a block diagram which continues the process illustrated in FIG. 6 in accordance with an embodiment of the present invention. In FIG. 7, search index 505 which is used for search operations is created. In some embodiments, build indexer tool 501 uses content 601 and search configuration 506 to create the search index 505.

Figure 8:
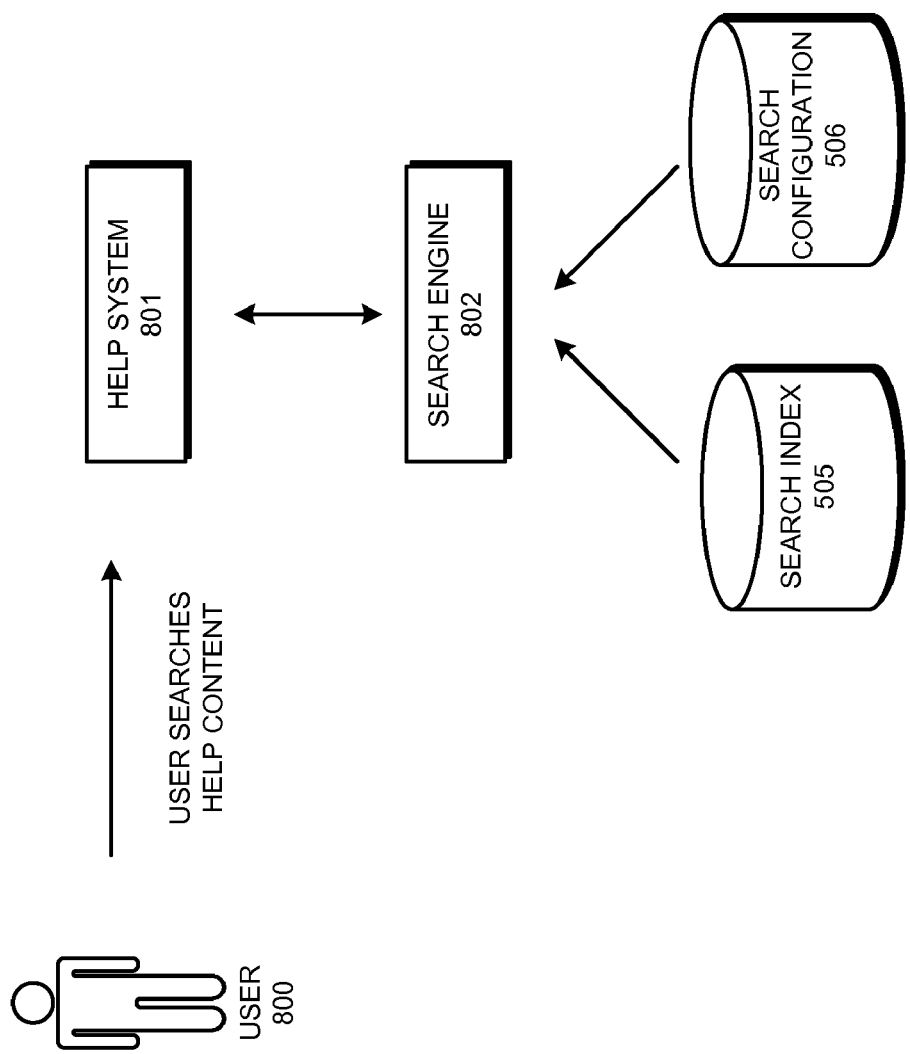
FIG. 8 presents a block diagram which continues the process illustrated in FIG. 7 in accordance with an embodiment of the present invention.

FIG. 8 presents a block diagram which continues the process illustrated in FIG. 7 in accordance with an embodiment of the present invention. In FIG. 8, end user 800 performs a search operation within application 502. In some embodiments, search engine 802 is used to perform search queries against search index 505 for content 601, which is included in help system 801. Note that search engine 802 can be the same search engine as search engine 504.

In some embodiments, the same search configuration, search index, and content runtime artifacts are shared across all the processes.

Figure 9:
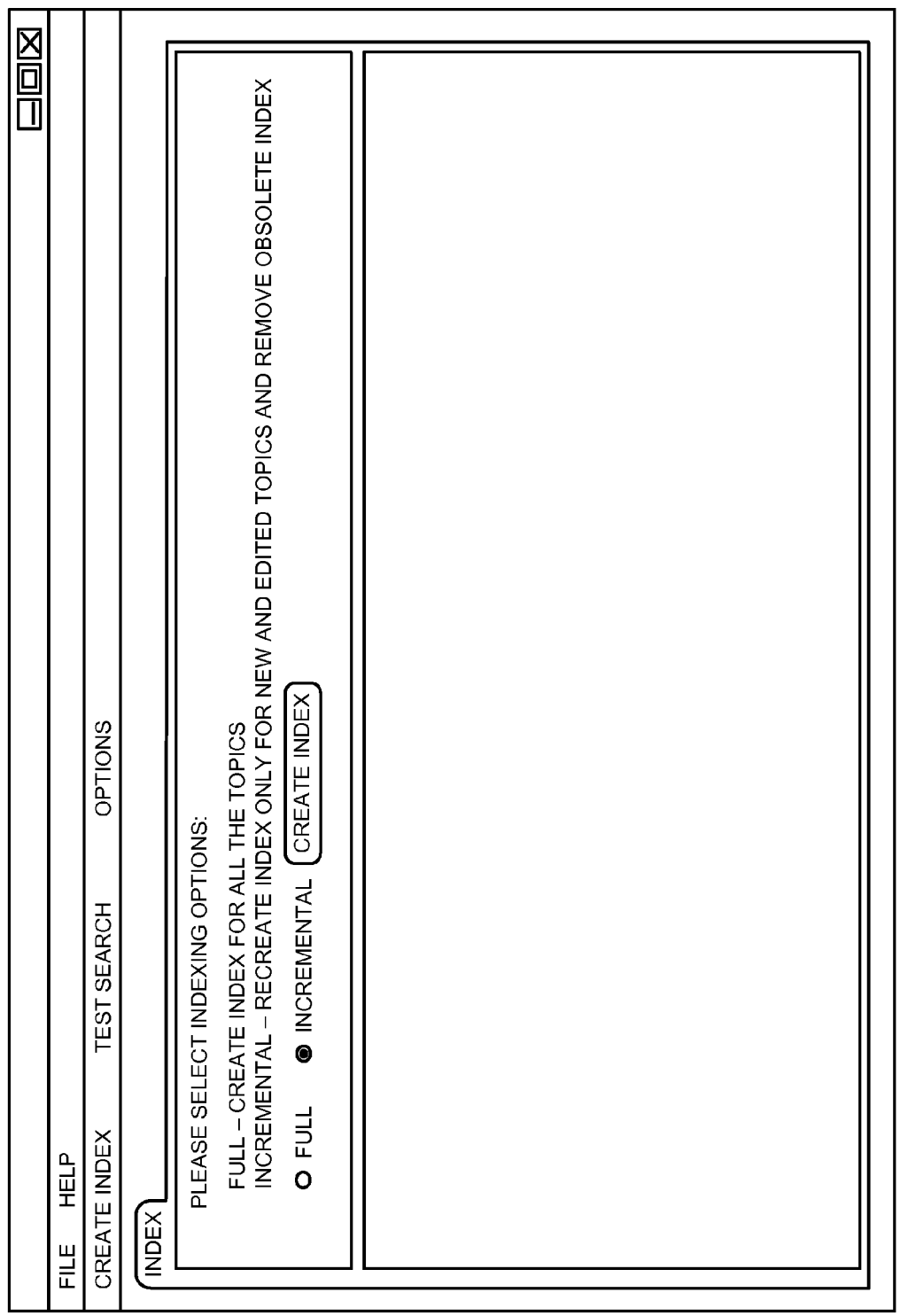
FIG. 9 presents an exemplary user interface window for generating indexes in accordance with an embodiment of the present invention.

FIG. 9 presents an exemplary user interface window for generating indexes in accordance with an embodiment of the present invention. The full indexes option indexes all files in a content folder. The incremental indexes option only indexes new and edited files in the content folder, and removes the obsolete index entries (to reflect content files that have been deleted).

Figure 10B:
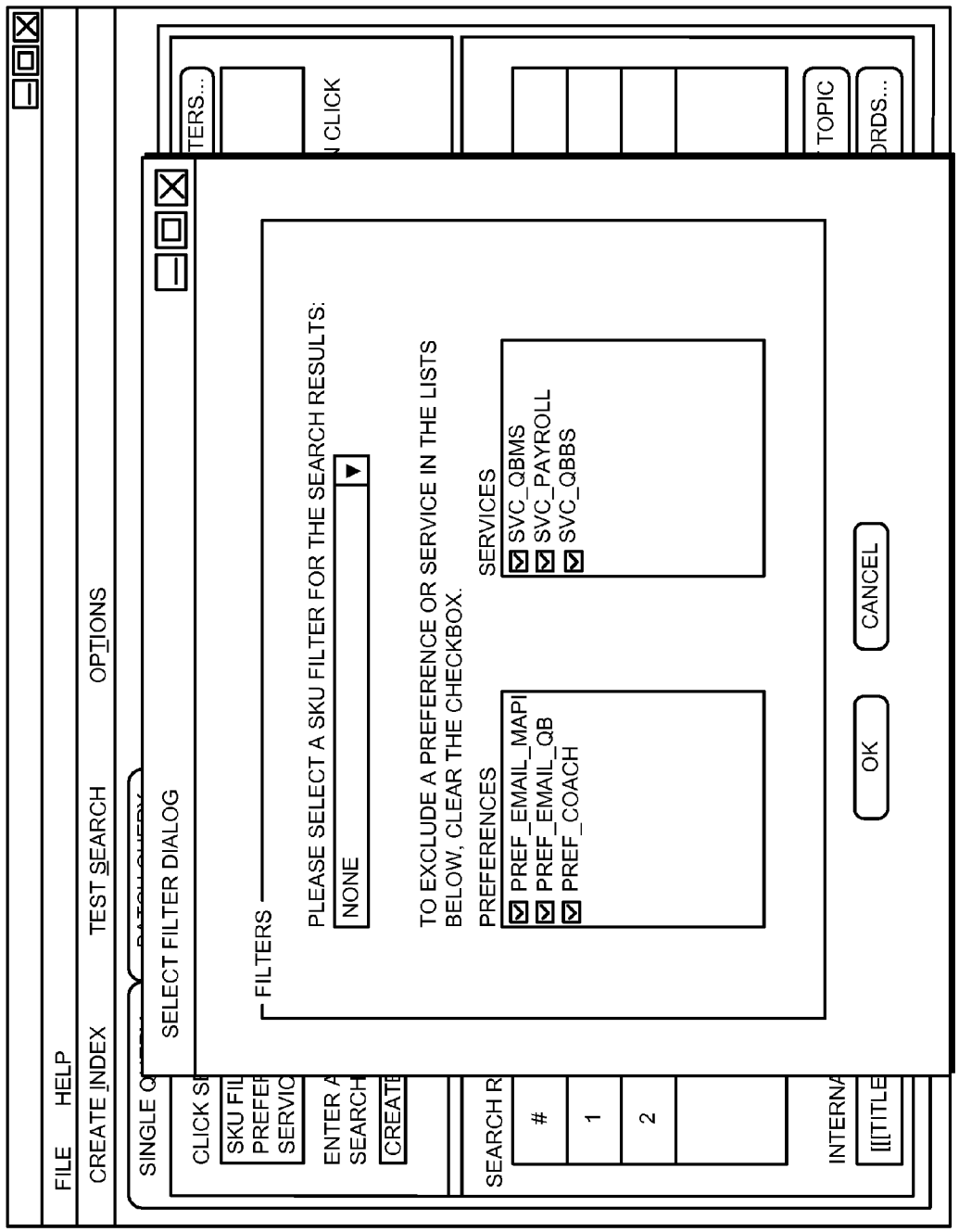
FIG. 10B presents an exemplary user interface window for selecting filters to be used when performing queries in accordance with an embodiment of the present invention.

FIG. 10A presents an exemplary user interface window for performing queries in accordance with an embodiment of the present invention. The single query tab is used to perform single-line search query. As illustrated in FIG. 10A, the search terms are "create invoice." After a search is performed, the search results are displayed with the title, score, and content path. A search content analyst can then select the search result to bring up a window which includes the content of the selected topic (see FIG. 10D). The search content analyst can also access filters which are applied to the searches (see FIG. 10B). The search content analyst can also modify the internal query syntax which is used by the search engine to perform the query against the index.

FIG. 10B presents an exemplary user interface window for selecting filters to be used when performing queries in accordance with an embodiment of the present invention. The filters can include SKU filters, preferences and services selections.

Figure 10C:
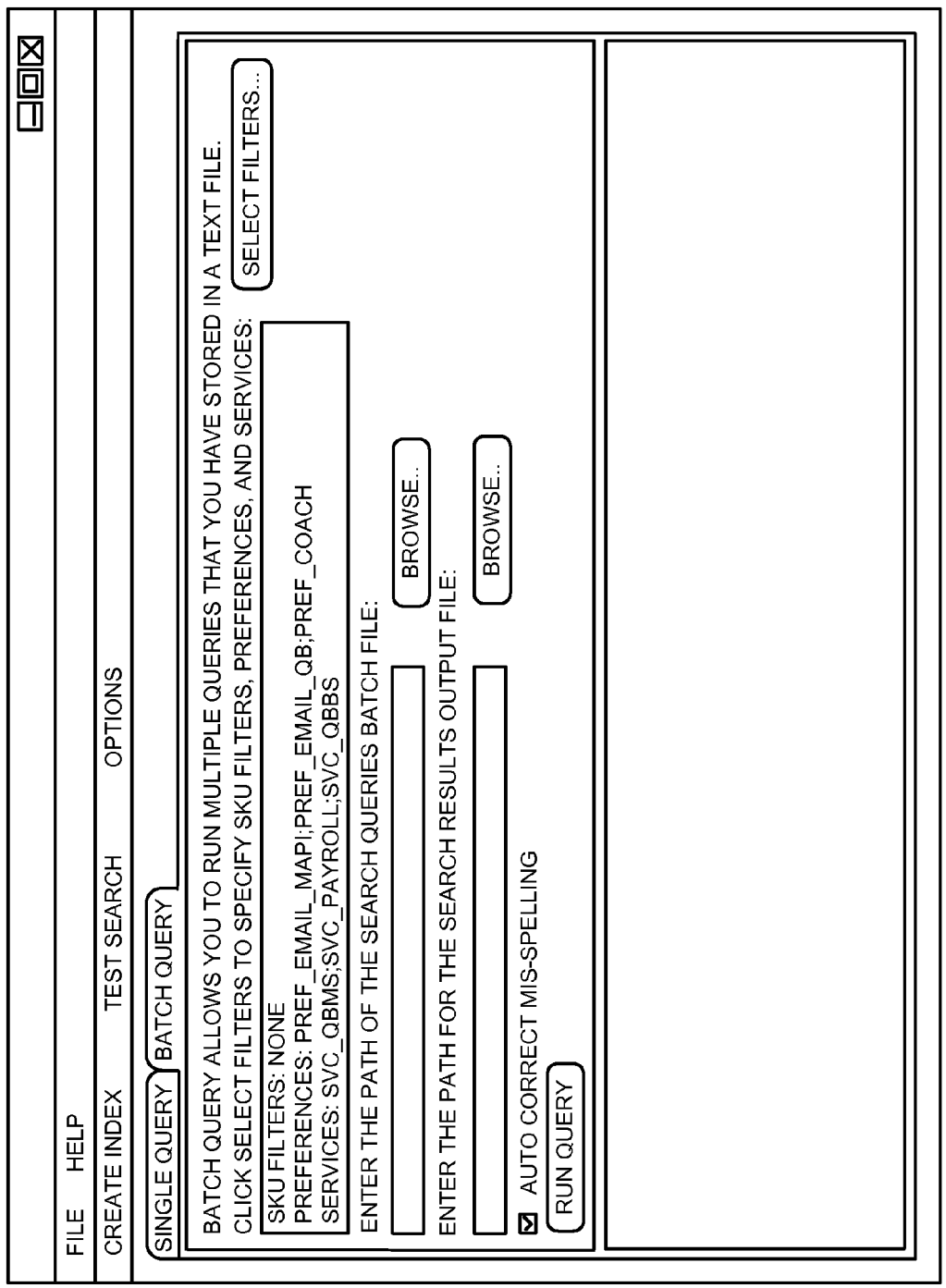
FIG. 10C presents an exemplary user interface window for performing batch queries in accordance with an embodiment of the present invention.

FIG. 10C presents an exemplary user interface window for performing batch queries in accordance with an embodiment of the present invention. Batch queries include one or more queries to be performed during a given search operation. In some embodiments, the batch queries are included in a file. In other embodiments, the batch queries are entered into the user interface window for batch queries.

Figure 10D:
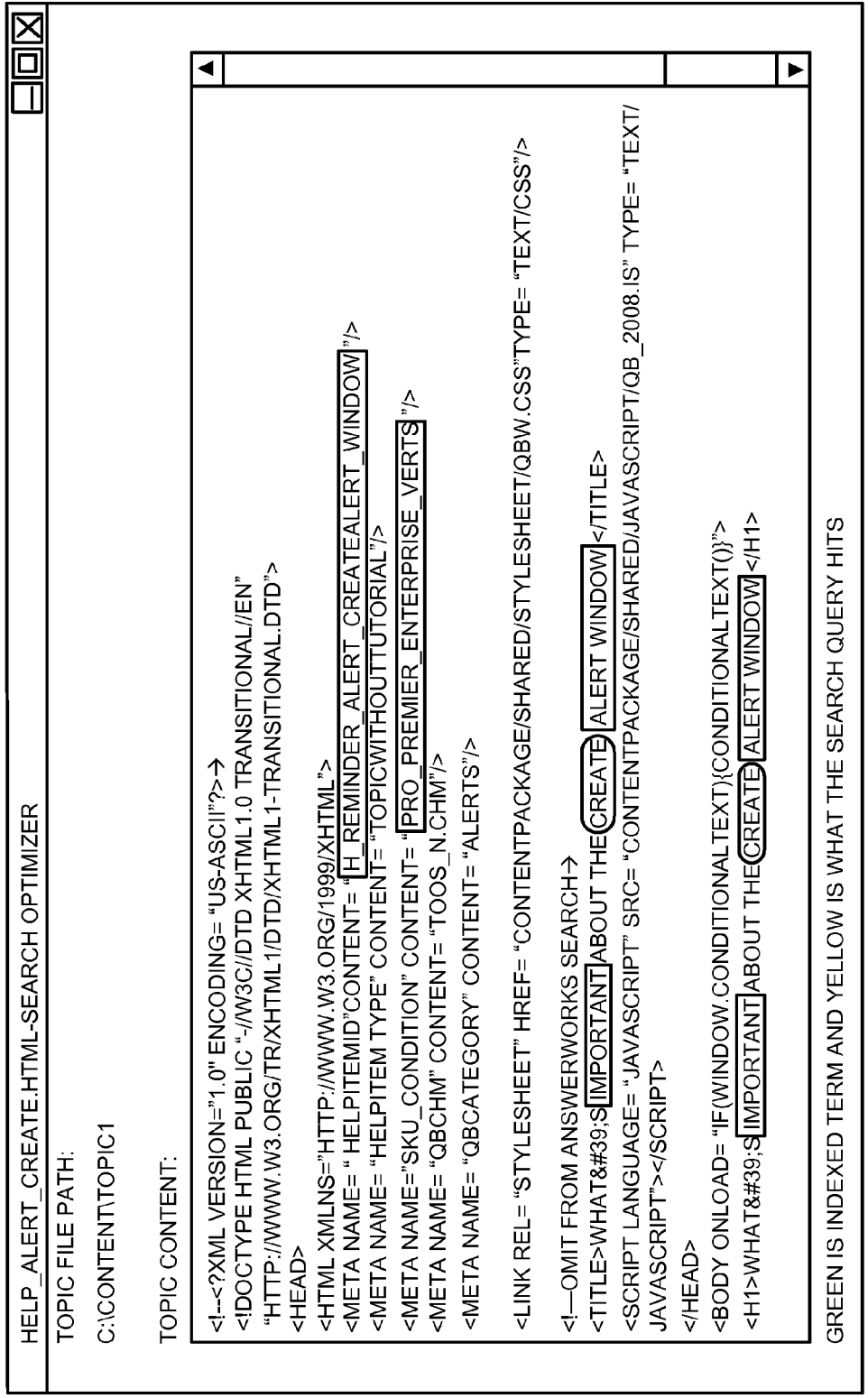
FIG. 10D presents an exemplary user interface window illustrating content that has been indexed, and words that have been hit by the search query, in accordance with an embodiment of the present invention.

FIG. 10D presents an exemplary user interface window illustrating content that has been indexed in accordance with an embodiment of the present invention. After selecting a search result to be displayed, a window is presented to the search content analyst illustrating words that were indexed (i.e., words enclosed by rectangles and ovals) and words that generated hits in the search results (i.e., words enclosed by ovals). This window allows the search content analyst to see the results of the search and how well the configuration parameters and content were at producing desired search results.

Figure 11A:
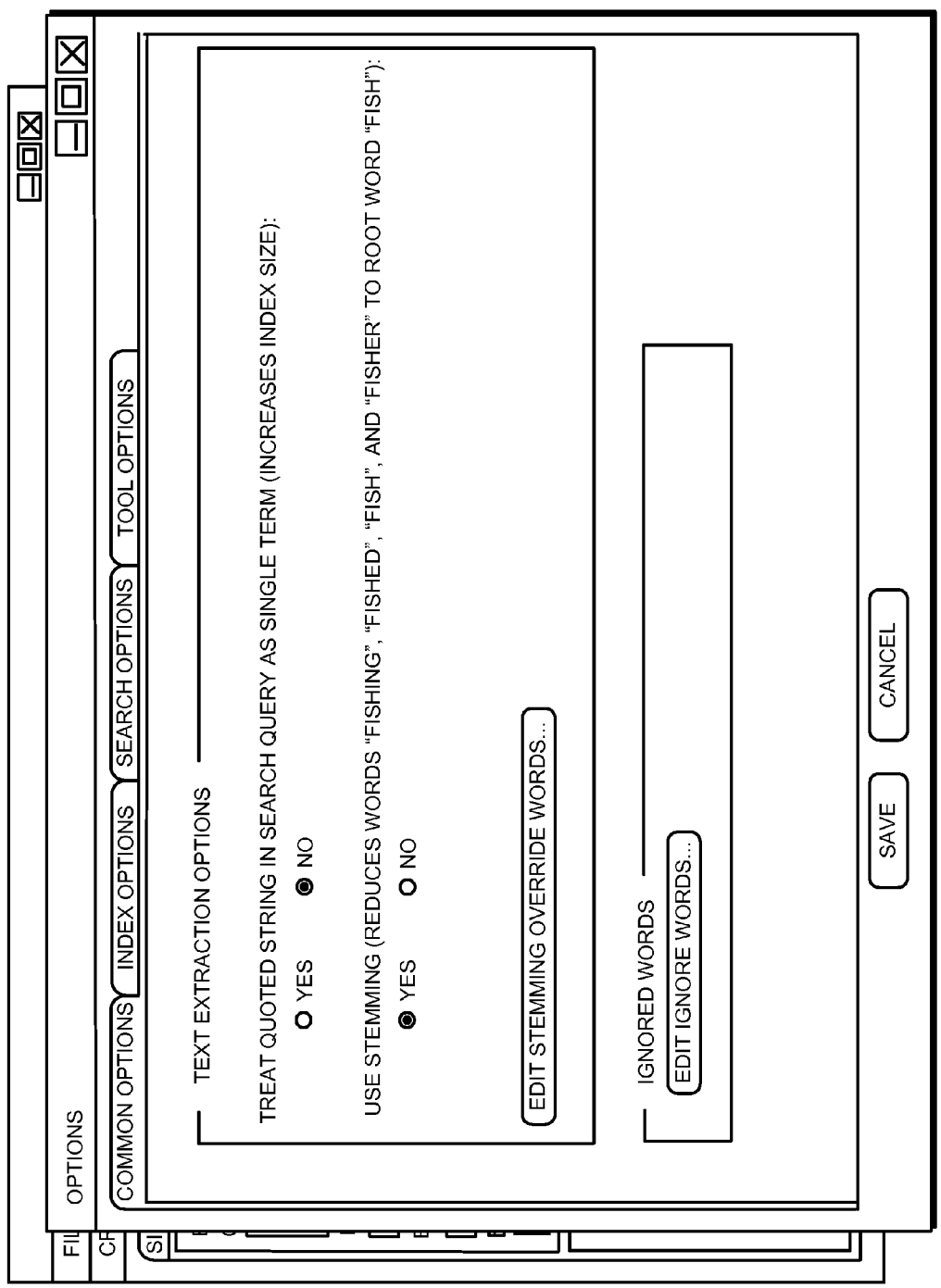
FIG. 11A presents an exemplary user interface window illustrating configuration parameters used for performing searches in accordance with an embodiment of the present invention.

FIG. 11A presents an exemplary user interface window illustrating configuration parameters used for performing searches in accordance with an embodiment of the present invention. The search content analyst can select whether quoted strings in a search query are treated as a single term or not. The search content analyst can also select whether stemming should be used (e.g., words such as "fishing," "fished," "fish," and "fisher" can be specified to have the same stem "fish" and are treated as the same word) (see FIG. 11B). The search content analyst can also specify words to ignore (see FIG. 11C)

Figure 11B:
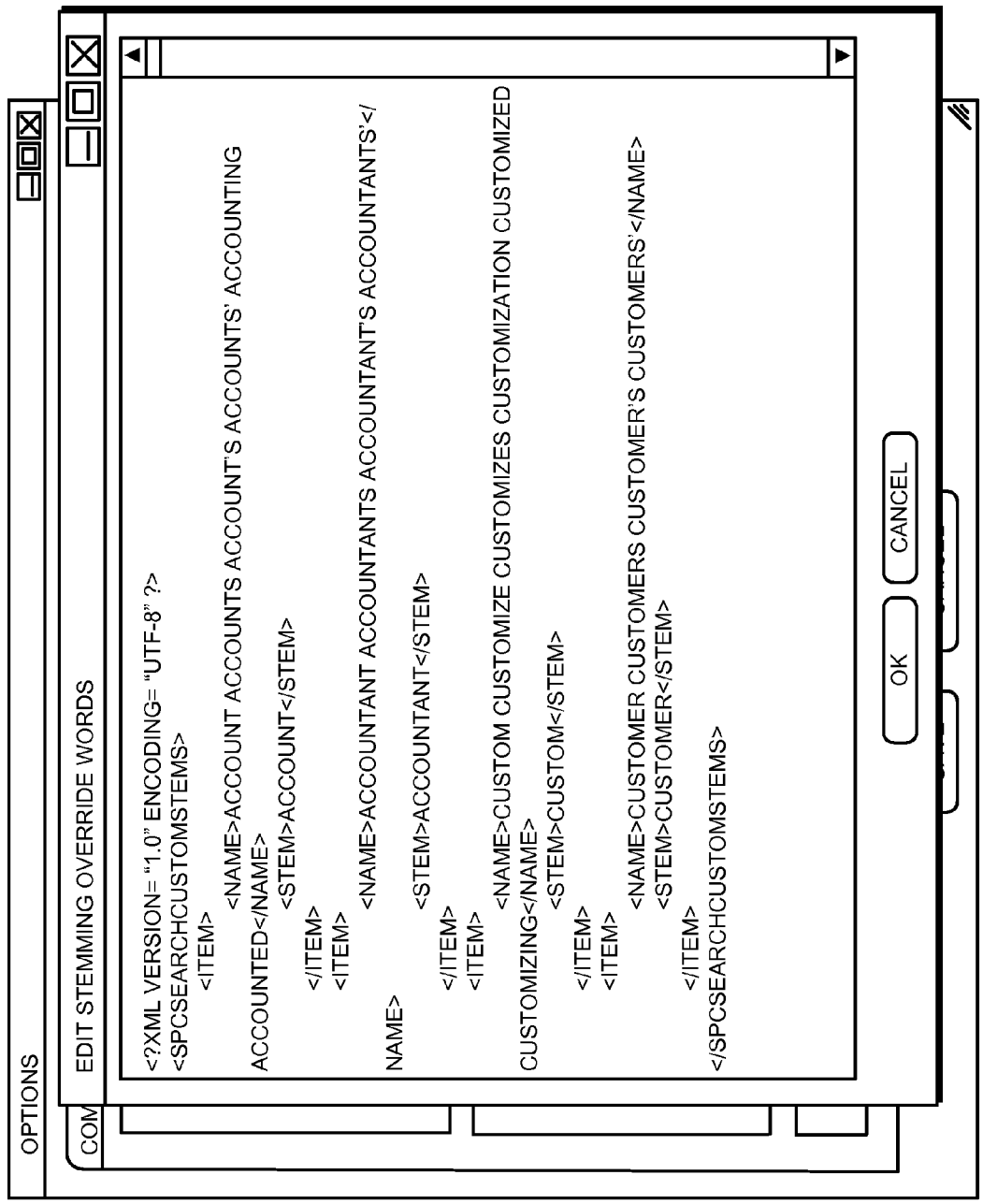
FIG. 11B presents an exemplary user interface window for editing stemming override words in accordance with an embodiment of the present invention.

FIG. 11B presents an exemplary user interface window for editing stemming override words in accordance with an embodiment of the present invention. In this exemplary interface, the search content analyst can edit the stemming override words. Note that although the stemming override words are specified in an extensible markup language (XML) file, any other structured file format can be used.

Figure 11C:
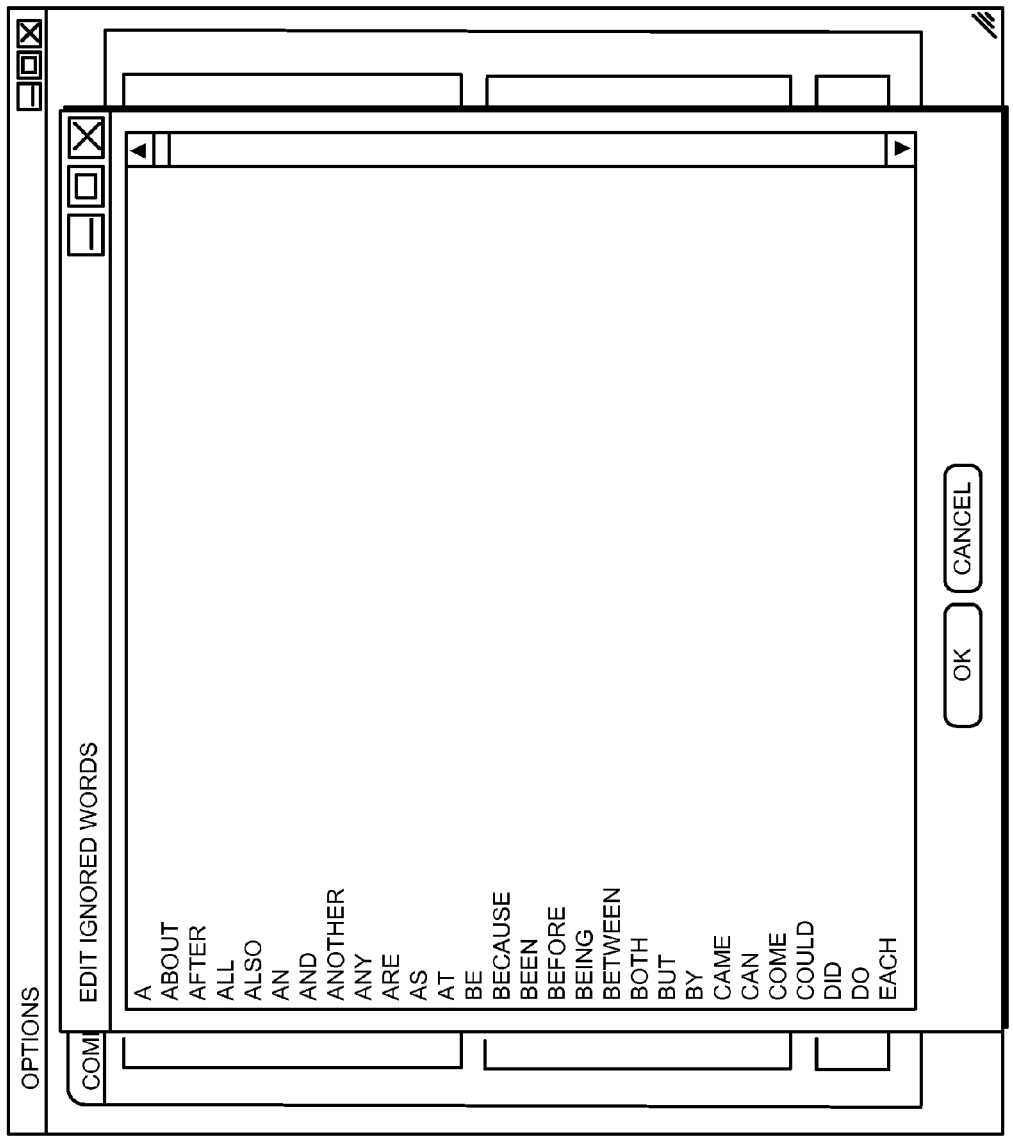
FIG. 11C presents an exemplary user interface window for editing ignored words in accordance with an embodiment of the present invention.

FIG. 11C presents an exemplary user interface window for editing ignored words in accordance with an embodiment of the present invention. In this exemplary interface, the search content analyst can edit the ignored words which are ignored when generating an index and when performing search operations.

Figure 11D:
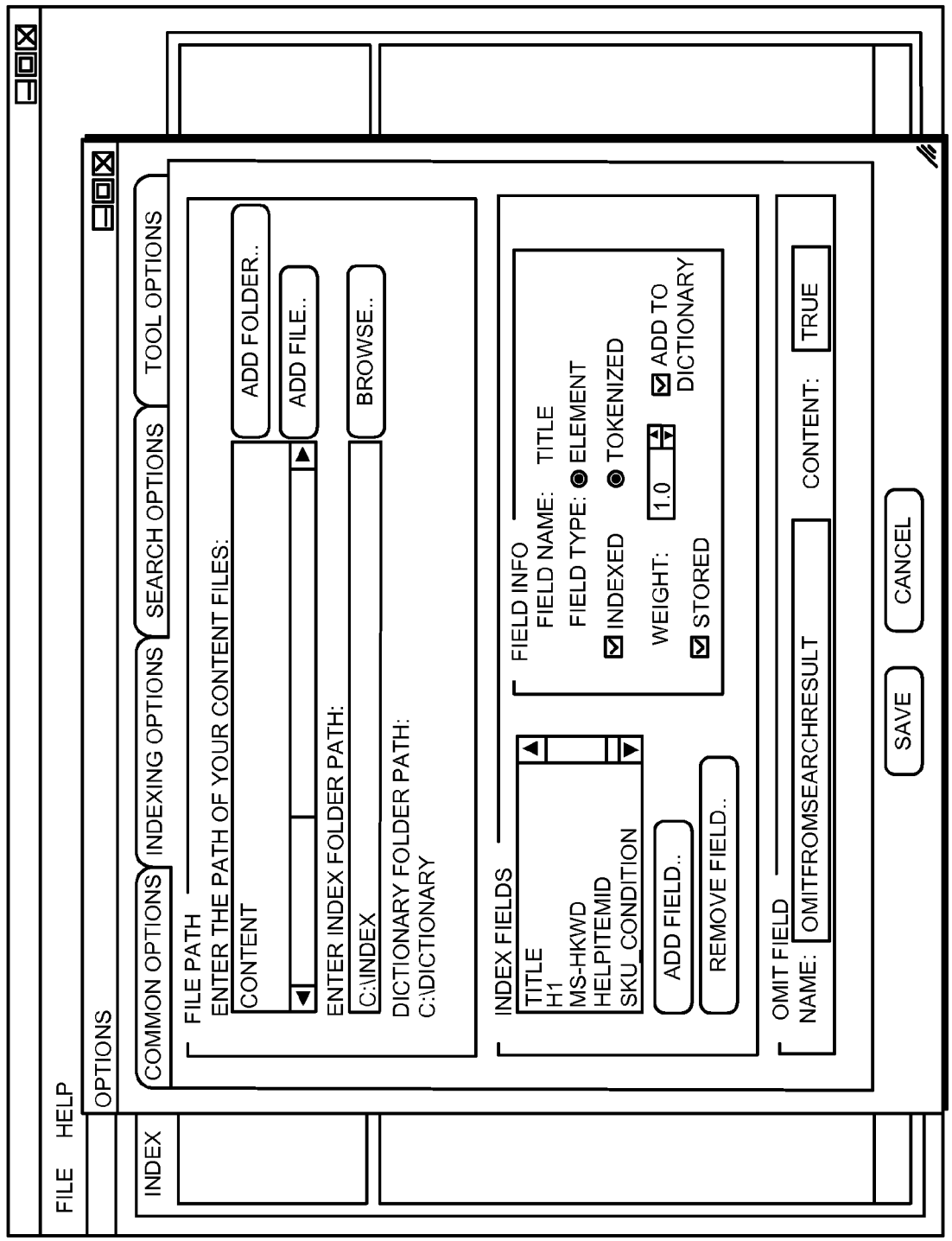
FIG. 11D presents an exemplary user interface window illustrating indexing parameters used for indexing content in accordance with an embodiment of the present invention.

FIG. 11D presents an exemplary user interface window illustrating indexing parameters used for indexing content in accordance with an embodiment of the present invention. The search content analyst can specify the path of the content, the path of the index, and the path of the dictionary of known words. The search content analyst can also specify which fields to index and the parameters for the field (e.g., the type of the field, whether the field is tokenized or not, the weighing factor associated with a field, whether the field is stored or indexed, and whether to add the field to the dictionary of known words). The search content analyst can also specify an omit field value which can be used in a meta-tag included in content to indicate that the content is to be omitted when performing an indexing and/or search operation.

Figure 11E:
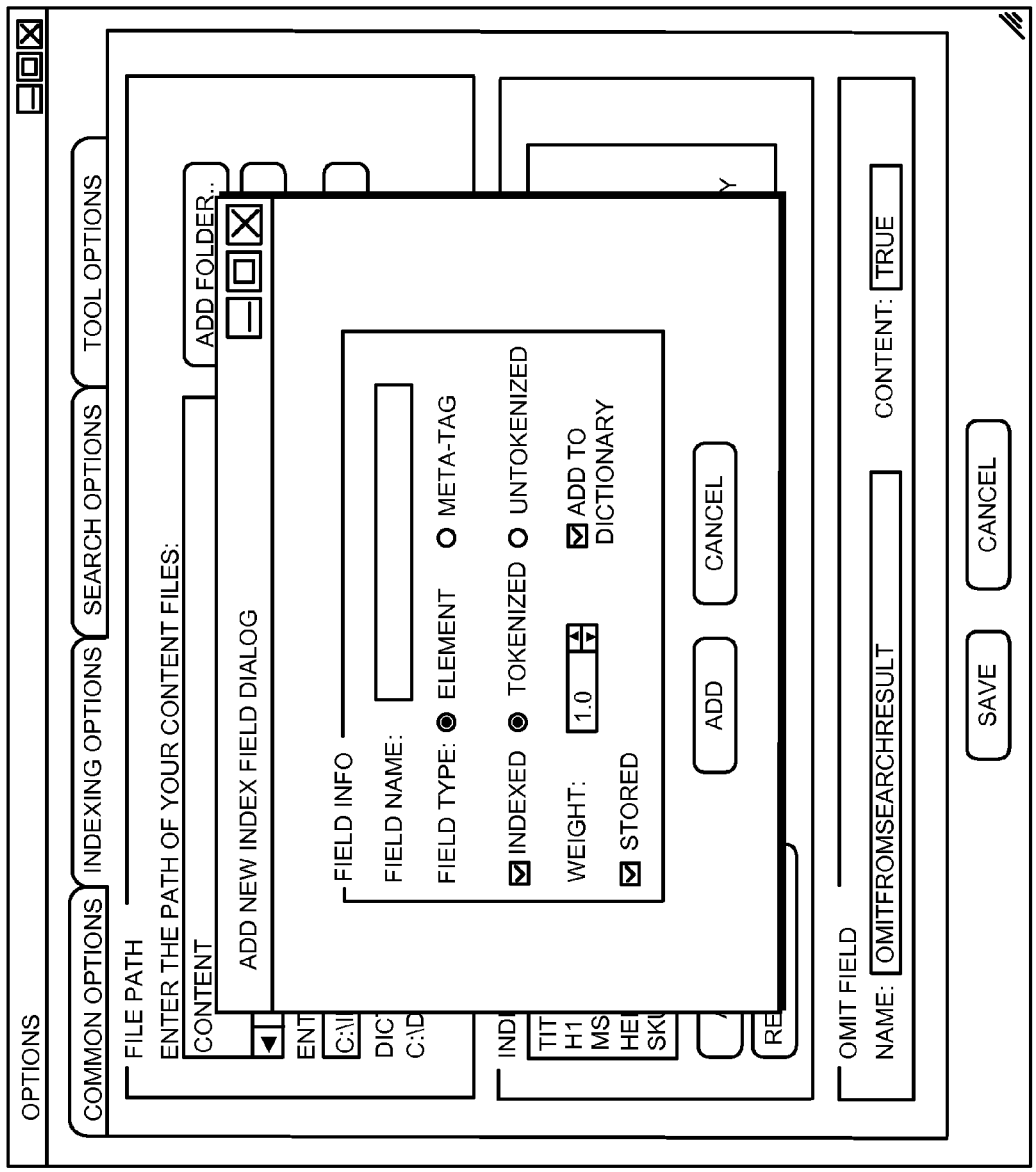
FIG. 11E presents an exemplary user interface window for adding new fields to be indexed in accordance with an embodiment of the present invention.

FIG. 11E presents an exemplary user interface window for adding new fields to be indexed in accordance with an embodiment of the present invention. This exemplary interface allows the search content analyst to add a new field to be indexed and to specify the parameters for the field.

Figure 11F:
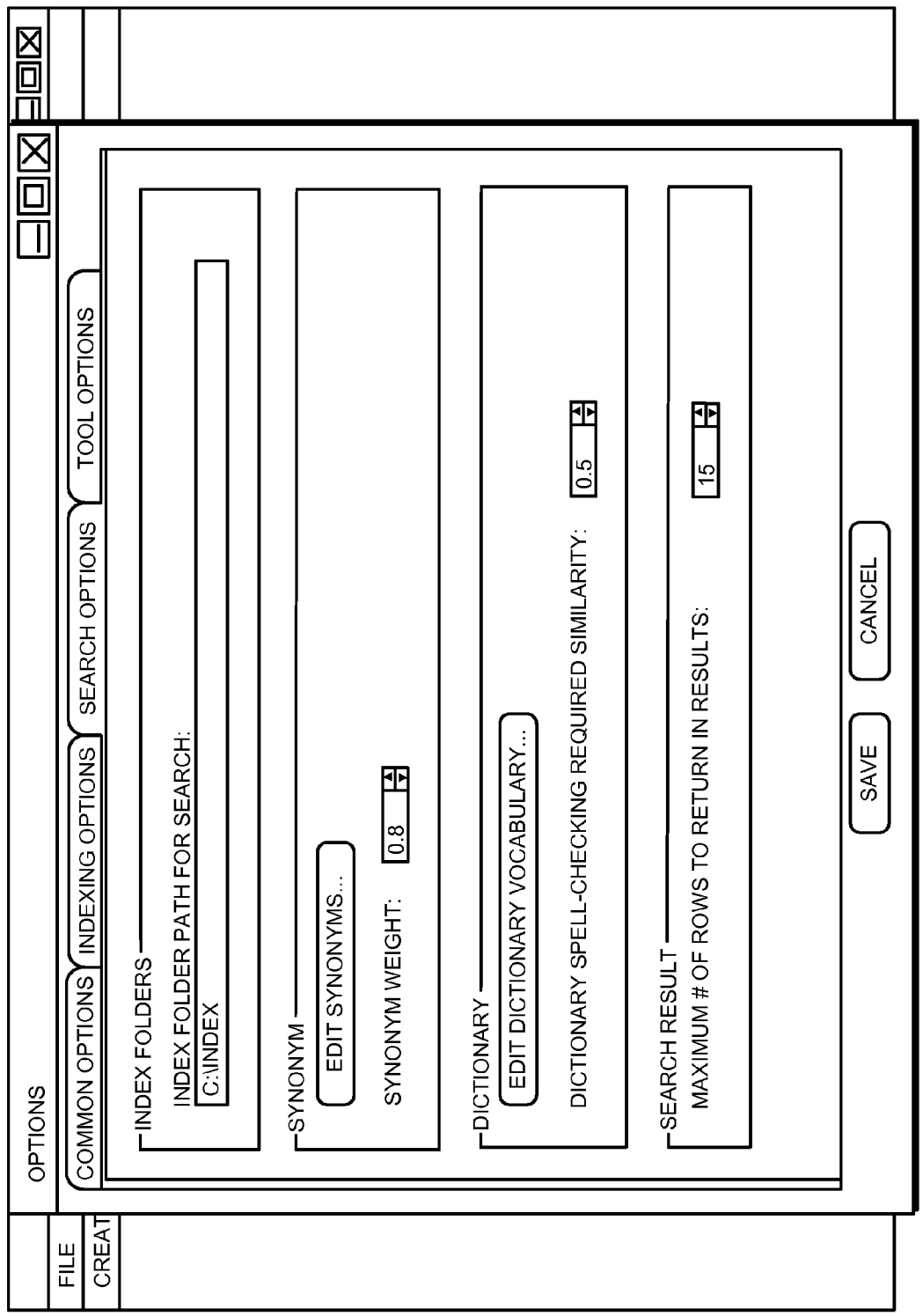
FIG. 11F presents an exemplary user interface window illustrating search parameters used for searching content in accordance with an embodiment of the present invention.

FIG. 11F presents an exemplary user interface window illustrating search parameters used for searching content in accordance with an embodiment of the present invention. This exemplary interface allows the search content analyst to specify the path for the index to be used for search operations, the list of synonyms (see FIG. 11G) and the weighting factor associated with synonyms, the list of known dictionary words (see FIG. 11H), and the maximum number of rows to return in the search results.

Figure 11G:
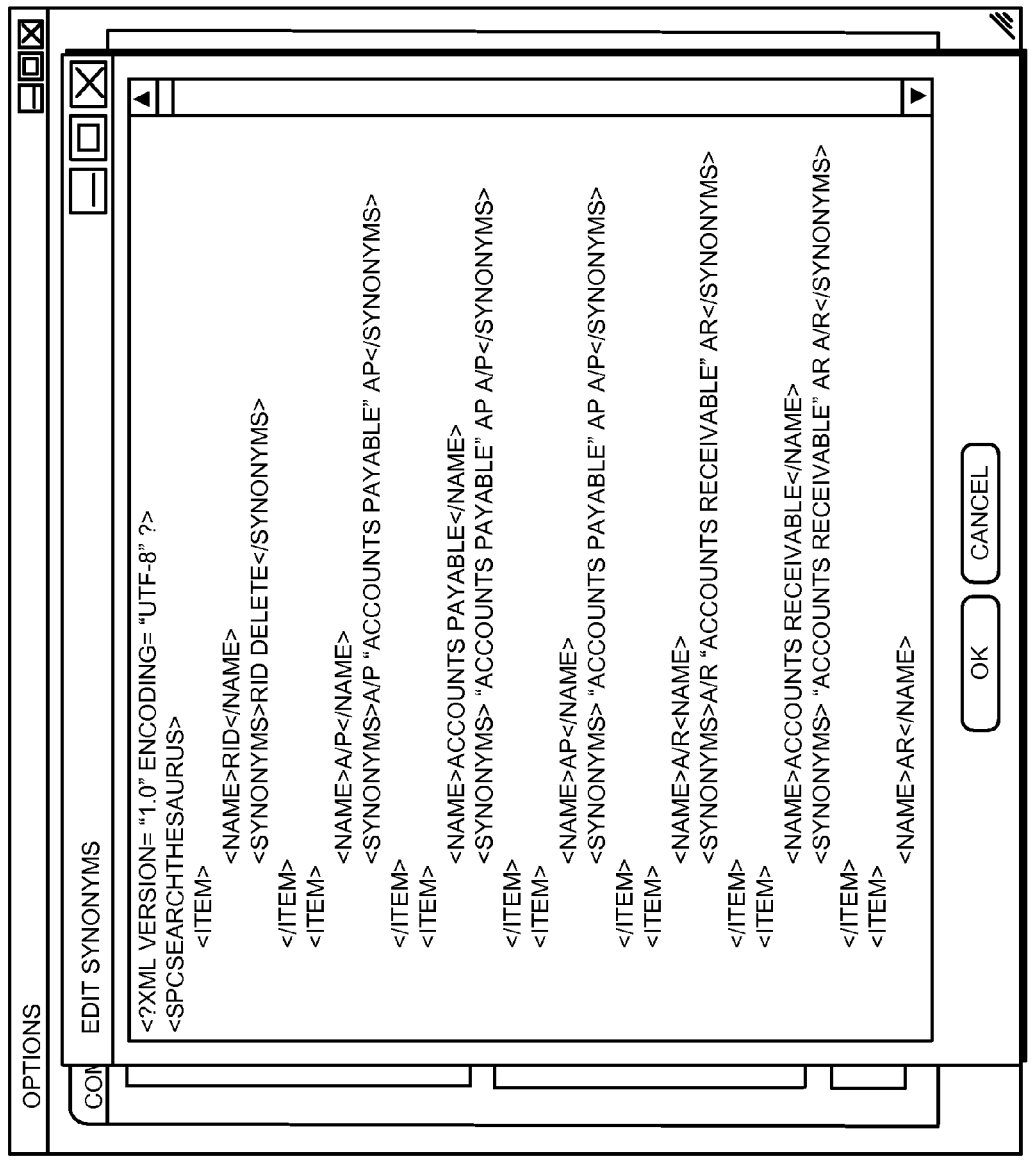
FIG. 11G presents an exemplary user interface window for editing synonyms in accordance with an embodiment of the present invention.

FIG. 11G presents an exemplary user interface window for editing synonyms in accordance with an embodiment of the present invention. In this exemplary interface, the search content analyst can edit the synonyms of words. Note that although the synonyms are specified in an extensible markup language (XML) file, any other structured file format can be used.

Figure 11H:
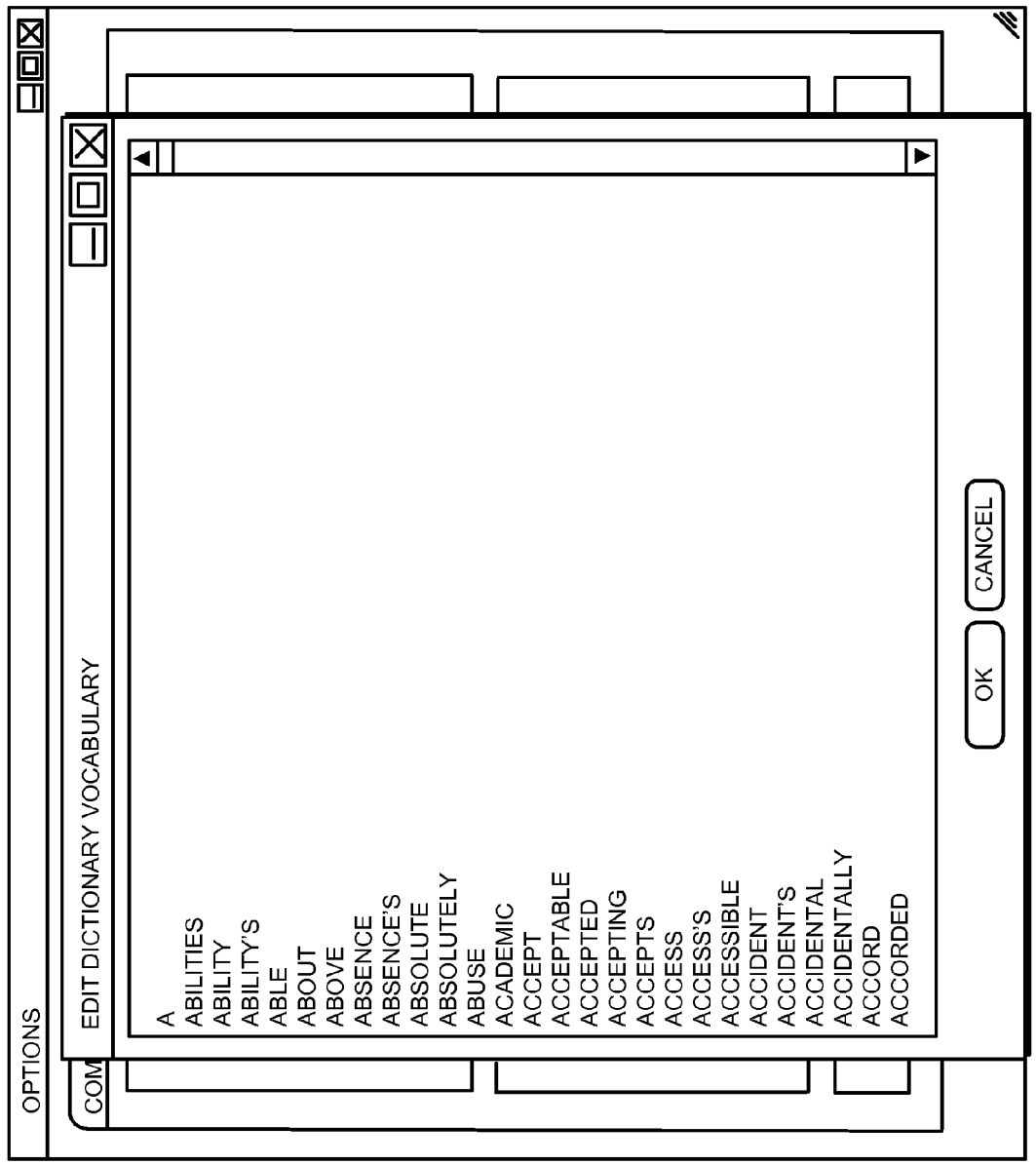
FIG. 11H presents an exemplary user interface window for editing a dictionary of known words in accordance with an embodiment of the present invention.

FIG. 11H presents an exemplary user interface window for editing a dictionary of known words in accordance with an embodiment of the present invention. In this exemplary interface, the search content analyst can edit the list of known dictionary words. This list can be used to perform a spell check of the content and to associate misspelled words with known words from the dictionary.

FIG. 11I presents an exemplary user interface window illustrating for specifying an application to be launched when editing a topic in accordance with an embodiment of the present invention.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for modifying content to tune search results, comprising:
   receiving content to be searched from a content author;
   iteratively performing, by a computer, the following operations until search results meet specified criteria,
      generating an index of the content based on a set of configuration parameters;
      performing a search against the index to produce the search results;
      determining whether the search results meet the specified criteria; and
      in response to determining that the search results do not meet the specified criteria,
      receiving a first modification to the set of configuration parameters from the content author,
      receiving a second modification to the content from the content author,
      applying the first modification to the set of configuration parameters, and
      applying the second modification to the content; and
      saving the set of configuration parameters into a configuration file which is used to generate the index for the content and to configure a search engine for a subsequent search.

2. The method of claim 1, wherein prior to receiving the content to be searched, the method further comprises generating the content to be searched.

3. The method of claim 1, wherein after receiving the content to be searched, the method further comprises determining the set of configuration parameters which are used to generate the index of the content.

4. The method of claim 1, wherein after saving the set of configuration parameters into the configuration file, the method further comprises distributing the configuration file to one or more applications, wherein the one or more applications can use the set of configuration parameters to build the index against which the search can be performed, and to use search parameters from the set of configuration parameters when performing searches.

5. The method of claim 1, wherein the set of configuration parameters include one or more of:
   indexing parameters;
   search parameters;
   an indication as to whether to use stemming;
   supported languages;
   a list of stemming override words; and
   a list of ignore words.

6. The method of claim 5, wherein the indexing parameters include one or more of:
   a path to a location of the content;
   a path to the index;
   index fields;
   index field parameters; and
   an omit field which specifies that the content is to be omitted from search results.

7. The method of claim 6, wherein the index fields include one or more of:
   hypertext-markup language (HTML) tags; and
   meta-tags.

8. The method of claim 6, wherein the index field parameters include one or more of:
   a weighting factor associated with the index field;
   an indication as to whether the field is stored in the index;
   an indication as to whether the field is indexed;
   an indication as to whether the field is tokenized an indication as to whether the field is untokenized;
   an indication as to whether the field is an HTML tag;
   an indication as to whether the field is a meta-tag; and
   an indication as to whether the field is added to a dictionary which can be used to make spelling suggestions to a user.

9. The method of claim 1, wherein the search parameters include one or more of:
   a list of synonyms;
   a weighting factor associated with synonyms;
   a list of known words; and
   query templates which include one or more of:
   fields to be searched;
   Boolean operators to be used in the search; and
   a weighting factor based on proximity of words to each other.

10. The method of claim 1, wherein the content includes one or more of:
    HTML files;
    text files;
    portable-document format (PDF) documents;
    spreadsheets;
    word processor documents; and
    presentations.

11. The method of claim 1, wherein the specified criteria include metrics which indicate whether search terms used to perform the search produce search results that include the content.

12. A non-transitory computer-readable storage medium storing instructions that when executed by a computer cause the computer to perform a method for modifying content to tune search results, wherein the method comprises:
    receiving content to be searched from a content author;
    iteratively performing the following operations until search results meet specified criteria:
       generating an index of the content based on a set of configuration parameters;
       performing a search against the index to produce the search results;
       determining whether the search results meet the specified criteria; and
       in response to determining that the search results do not meet the specified criteria:
          receiving a first modification to the set of configuration parameters from the content author,
          receiving a second modification to the content from the content author,
          applying the first modification to the set of configuration parameters, and
          applying the second modification to the content; and
    saving the set of configuration parameters into a configuration file which is used to generate the index for the content and to configure the search engine for a subsequent search.

13. The non-transitory computer-readable storage medium of claim 12, wherein prior to receiving the content to be searched, the method further comprises generating the content to be searched.

14. The non-transitory computer-readable storage medium of claim 12, wherein after receiving the content to be searched, the method further comprises determining the set of configuration parameters which are used to generate the index of the content.

15. The non-transitory computer-readable storage medium of claim 12, wherein after saving the set of configuration parameters into the configuration file, the method further comprises distributing the configuration file to one or more applications, wherein the one or more applications can use the set of configuration parameters to build the index against which the search can be performed, and to use search parameters from the set of configuration parameters when performing searches.

16. The non-transitory computer-readable storage medium of claim 12, wherein the set of configuration parameters include one or more of:
    indexing parameters;
    search parameters;
    an indication as to whether to use stemming;
    supported languages;
    a list of stemming override words; and
    a list of ignore words.

17. The non-transitory computer-readable storage medium of claim 16, wherein the indexing parameters include one or more of:
    a path to a location of the content;
    a path to the index;
    index fields;
    index field parameters; and
    an omit field which specifies that the content is to be omitted from search results.

18. The non-transitory computer-readable storage medium of claim 17, wherein the index fields include one or more of:
    hypertext-markup language (HTML) tags; and
    meta-tags.

19. The non-transitory computer-readable storage medium of claim 17, wherein the index field parameters include one or more of:
    a weighting factor associated with the index field;
    an indication as to whether the field is stored in the index;
    an indication as to whether the field is indexed;
    an indication as to whether the field is tokenized an indication as to whether the field is untokenized;
    an indication as to whether the field is an HTML tag;
    an indication as to whether the field is a meta-tag; and
    an indication as to whether the field is added to a dictionary which can be used to make spelling suggestions to a user.

20. The non-transitory computer-readable storage medium of claim 12, wherein the search parameters include one or more of:
    a list of synonyms;
    a weighting factor associated with synonyms;
    a list of known words; and
    query templates which include one or more of:
    fields to be searched;

Boolean operators to be used in the search; and a weighting factor based on proximity of words to each other.

21. The non-transitory computer-readable storage medium of claim 12, wherein the content includes one or more of:

HTML files;

text files;

portable-document format (PDF) documents;

spreadsheets;

word processor documents; and presentations.

22. The non-transitory computer-readable storage medium of claim 12, wherein the specified criteria include metrics which indicate whether search terms used to perform the search produce search results that include the content.

23. An apparatus that modifies content to tune search results, comprising:

a receiving mechanism configured to receive content to be searched from a content author;

an indexing mechanism configured to generate an index of the content based on a set of configuration parameters until search results meet specified criteria;

a search engine configured to perform a search against the index to produce the search results;

an analysis mechanism configured to determine whether the search results meet the specified criteria;

a modification mechanism configured to:

receive a first modification to the set of configuration parameters from the content author, receive a second modification to the content from the content author apply the first modification to the set of configuration parameters, and apply the second modification to the content; and an output mechanism configured to save the set of configuration parameters into a configuration file which is used to generate the index for the content and to configure a search engine for a subsequent search in response to the search results meeting the specified criteria.

24. The apparatus of claim 23, further comprising a visualization mechanism configured to display one or more search results in a user interface of a computer system.

25. The apparatus of claim 24, wherein if a given search result is selected within the user interface of the computer system, the visualization mechanism is configured to:

display the content included in the given search result in the user interface; and highlight one or more of:

words in the content that have been indexed; and words in the content that matched search terms used to perform the search.

26. The apparatus of claim 25, wherein if a user uses a pointing device to hover over a given word in the displayed content within the user interface, the visualization mechanism is configured to display synonyms associated with the word in the user interface.

* * * * *